(12) United States Patent
Buss

(10) Patent No.: US 6,912,833 B2
(45) Date of Patent: Jul. 5, 2005

(54) PIVOTING HOOKS FOR PARALLELOGRAM LIFT LINKAGES

(75) Inventor: Steven Henry Buss, Horicon, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/391,728

(22) Filed: Mar. 19, 2003

(65) Prior Publication Data

US 2003/0188905 A1 Oct. 9, 2003

Related U.S. Application Data

(62) Division of application No. 09/885,460, filed on Jun. 20, 2001, now Pat. No. 6,584,756.

(51) Int. Cl.$^7$ ............................................. A01D 34/64
(52) U.S. Cl. ......................................... 56/15.6; 56/15.9
(58) Field of Search ................................ 56/15.6, 15.7, 56/15.8, 14.9, DIG. 3, DIG. 9, DIG. 10, DIG. 11; 172/272, 273

(56) References Cited

U.S. PATENT DOCUMENTS

| | | | |
|---|---|---|---|
| 3,706,186 A | | 12/1972 | Hurlburt et al. |
| 3,948,025 A | * | 4/1976 | Erdman ...................... 56/10.1 |
| 4,869,057 A | * | 9/1989 | Siegrist ...................... 56/15.9 |
| 4,882,898 A | | 11/1989 | Samejima et al. |
| 5,025,617 A | | 6/1991 | Kuhn et al. |
| 5,528,889 A | | 6/1996 | Kure et al. |
| 5,956,932 A | | 9/1999 | Schmidt |
| 6,293,077 B1 | | 9/2001 | Pierce et al. |

FOREIGN PATENT DOCUMENTS

DE 43 36 492 6/1994

OTHER PUBLICATIONS

Patent Abstracts of Japan, vol. 018, No. 647 (C–1283) & JP 06 253639 A (Kubota Corp), Sep. 13, 1994.

* cited by examiner

Primary Examiner—Robert E Pezzuto

(57) ABSTRACT

Pivoting hooks usable with four bar parallelogram implement lift linkages are provided. The hooks are pivotally attached at the forward edge of the implement to receive the cross bar of a suspension mechanism such as that taught in U.S. Pat. No. 5,025,617. The pivotal connection and axis about which the hooks are supported on the deck comprise one corner of the four bar parallelogram lift linkage. The hooks pivot forwardly and downwardly to receive the cross bar and then swing up as tension is applied to the hanger to support the deck. As the cross bar slides forwardly into the throats of the hooks when the hanger is tensioned, it is retained in the proper parallelogram lift geometry so that the deck remains level as it is adjusted throughout its vertical cutting height. The use of the pivoting hooks permits decks with extended fore and aft dimensions to be used with existing four bar parallelogram designs.

7 Claims, 6 Drawing Sheets

PIVOTING HOOKS FOR PARALLELOGRAM LIFT LINKAGES

CROSS-REFERENCE

This application is a division of U.S. application Ser. No. 09/885,460, filed 20 Jun. 2001 now U.S. Pat. No. 6,584,756.

FIELD OF THE INVENTION

The present invention relates to vehicles that utilize implements and more specifically to a mechanism for releasably suspending an implement beneath such a vehicle.

BACKGROUND OF THE INVENTION

Vehicles such as utility or lawn tractors are frequently operated with a variety of attachments and/or implements. Often one implement is used for a period of time and then removed to allow the tractor to be used with a different implement. Even if the implement is not frequently replaced with another, it must occasionally be removed and reinstalled as repairs, adjustments and/or maintenance is performed. Accordingly, it is desirable to have a mechanism for mounting implements so that they can be quickly and easily installed and/or removed.

Implements such as mower decks must be attached so they can be used at a variety of operating heights. Generally, mower decks are used to cut grass at heights varying between one and three and a half inches. To support the deck in a level configuration at each of the heights throughout its cutting range, the decks are mounted to swing on a parallelogram arrangement.

One suspension mechanism that mounts the mower deck between the front and rear wheels of the vehicle with an appropriate parallelogram arrangement and also facilitates quick and easy installation and removal is found in U.S. Pat. No. 5,025,617 (hereinafter referred to as "the '617 patent"), which is assigned to assignee of the present invention. That patent is incorporated by reference herein.

The mechanism described in the '617 patent utilizes a pair of laterally spaced apart lift links pivotally connected to the tractor and to the rear of the implement deck. At the front of the deck, a generally rectangularly shaped hanger has its rear link or cross member pivotally received in hooks carried at the forward end of the deck and its front link or cross member pivotally received in hooks carried on the tractor. The sides of the hanger serve as draft links to support the forward end of the deck. The rear lift links and forward draft links of the hanger serve as the two opposite and equal length sides of a parallelogram support arrangement to assure even and level movement of the deck as it is adjusted throughout its vertical cut range. As shown in the '617 patent, the pivotal connections at the upper and lower ends of the two rear lift links and at the upper and lower ends of the draft links provide the four corners of the parallelogram lift arrangement.

As the desire for improved grass cut quality has increased, the blade overlap on mower decks has increased. To provide this overlap, the fore and aft dimension of mower decks have increased. If the type of parallelogram suspension mechanism taught in the '617 patent is to be used with larger decks and existing parallelogram lift linkages, then either the front or rear connections to the larger decks must be relocated. Since mower decks are mounted between the front and rear wheels of the vehicle, there is not enough tire clearance to shift larger decks rearwardly and pivotally connect the lift links to the rear of the deck. To shift the pivoting connection on the front of the deck forwardly beneath the tractor could relocate the lower forward corner of the parallelogram and adversely affect the lift geometry that provides for the deck to be raised or lowered evenly as the cut height is adjusted. Alternatively, changing the lift geometry on the vehicle would adversely affect all other mower decks that could be mounted on that vehicle, therefore eliminating commonality of attachment.

Accordingly, it would be desirable to provide an implement suspension mechanism of the type described in the '617 patent that can be used with larger decks.

It would also be desirable to provide an implement suspension mechanism that can accommodate the larger mower decks without altering the parallelogram lift geometry presently available on many tractors.

Further, it would be desirable to provide a suspension mechanism that permits the connection between the front of larger decks and lower rear end of the front draft links to be located forwardly of the deck yet retain in its original location the pivotal connection with the deck that serves as one of the four parallelogram corners.

It would also be desirable to provide a suspension mechanism that maintains the parallelogram lift geometry to assure that the cut height of the deck is level from the front of the deck to its rear as it is adjusted through its range as well as a mechanism that allows the deck to be quickly and easily installed or removed.

SUMMARY OF THE INVENTION

Toward these ends, there is provided a pair of pivoting hooks on the front of the mower deck. The pivotal connection of the hooks with the deck serves as the front lower corner of the parallelogram lift arrangement. Since the location of this corner of the parallelogram is maintained, the lift geometry is maintained. The hooks are able to swing in an arc forwardly and downwardly to allow the rear crossbar of the hanger to be inserted into the throat of each pivoting hook. Since the hooks pivot forwardly and downwardly, the rear crossbar of the hanger can easily be inserted into or removed from them even though the front end of larger decks extends further forwardly. A stop is provided to prevent the hooks from swinging too far downwardly. As tension is provided to the draft links by a bell crank arrangement, the cross bar slides forwardly into the throat of the hooks and is retained in a line directly between the front lower pivot and front upper pivot of the parallelogram. In this way, the parallelogram lift geometry is maintained with larger decks throughout the range of vertical adjustment as cutting height is changed.

As is also taught in the '617 patent, the bell crank arrangement is provided on the front crossbar of the hanger to tension or release the draft links. As the links are tensioned, the pivoting hooks on the mower deck swing upwardly with the draft links being retained in the proper parallelogram configuration.

With this arrangement, the proper mower deck lift geometry is realized with larger decks and the resulting cut height of the deck remains level throughout its range of adjustment.

DESCRIPTION OF THE PREFERRED EMBODIMENT

Figure 1:
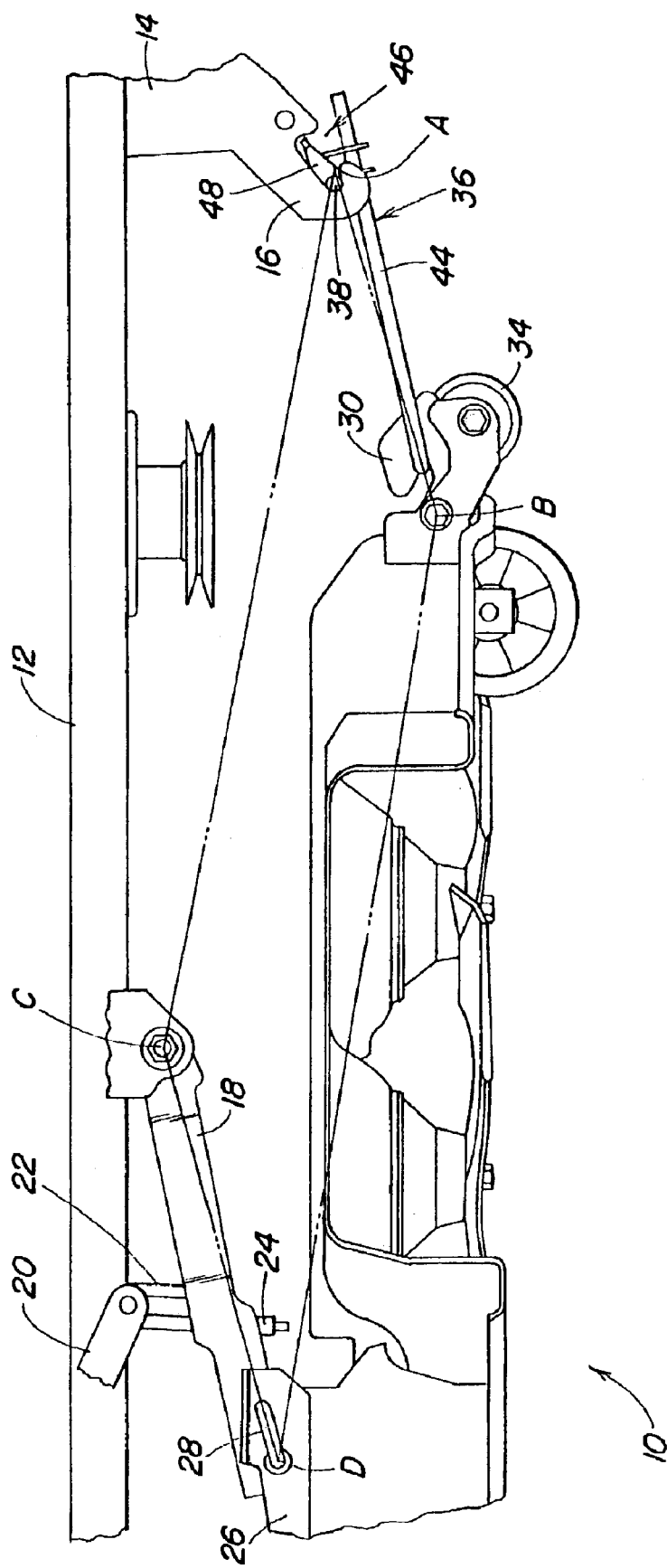
FIG. 1 is a schematic side view of a suspension mechanism supporting a larger mower deck having pivoting front hooks, the deck being in a lowered position.
Figure 2:
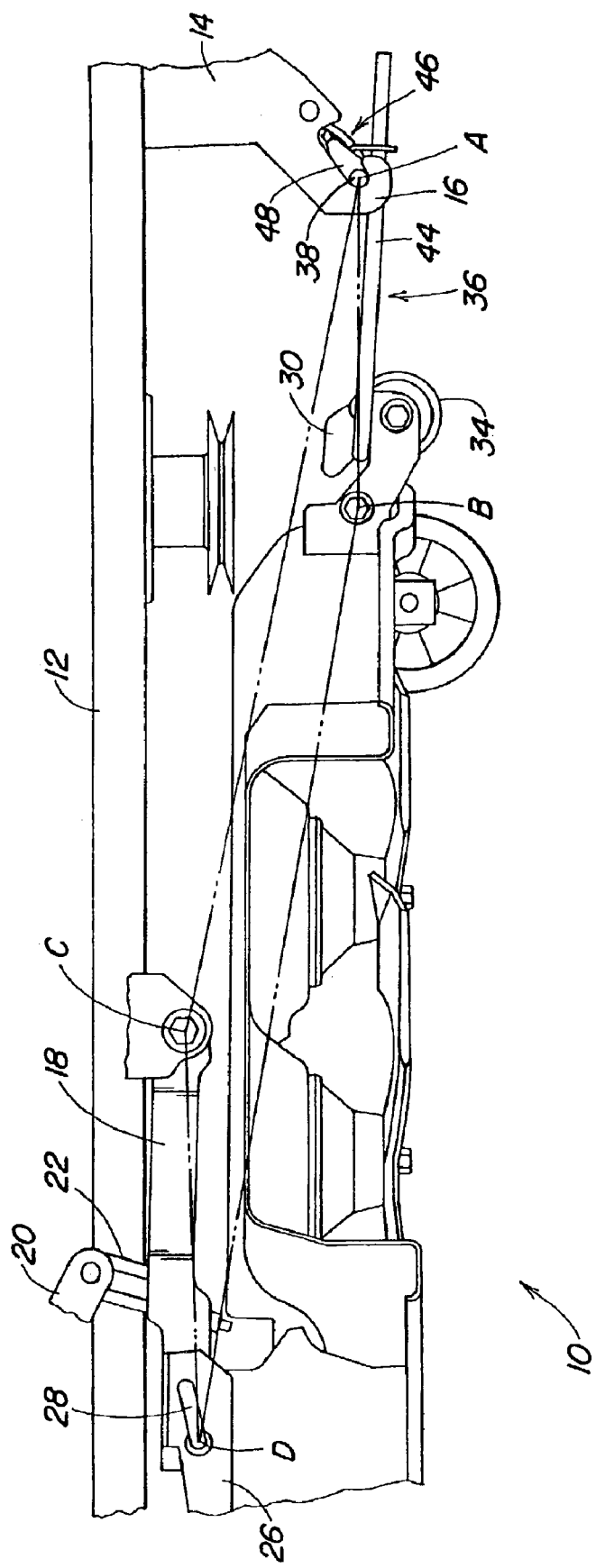
FIG. 2 is a schematic side view similar to FIG. 1 but illustrating the deck in a raised position.

Looking first to FIGS. 1 and 2, there is illustrated in schematic form a suspension mechanism for supporting an implement such as a mower deck 10 from a vehicle. The suspension mechanism is carried by the frame 12 of the vehicle. At its forward end, the frame 12 carries a depending bracket 14 which is provided with a pair of laterally spaced apart and upwardly opening jaws or hooks 16. At its rear portion, the frame 12 carries a pair of laterally spaced apart and rearwardly extending lift links 18. In the schematic side views of FIGS. 1 and 2, only one depending bracket 14, hook 16 and lift link 18 is illustrated.

The elongated lift links 18 are pivotally supported by the frame 12 at their upper end portions. A powered bell crank, which is not shown, serves to raise and/or lower a lever arm 20 that is coupled through the "P" hook 22 to raise or lower the lift links 18. Each "P" hook 22 includes a nut 24 at its lower end to adjust its length and therefore adjust the lift links 18 to fine tune the height of the deck 10.

Between the front brackets 14 and lift links 18 is carried the implement or mower deck 10 of the preferred embodiment. The deck 10 is supported by the suspension mechanism between the front and rear wheels of the vehicle or tractor, thereby allowing it to be moved into or out of position by sliding it laterally between the wheels.

For connecting the deck 10 to the rear lift links 18, upstanding brackets 26 are provided on the rear of the deck 10. The brackets 26 are provided with holes that receive spring loaded pins 28. The lower end of each lift link 18 is also provided with a hole to allow it to be attached to the bracket 26 with the spring loaded pin 28. These structures are common in the art and reference to the '617 patent for further explanation is suggested.

Figure 3:
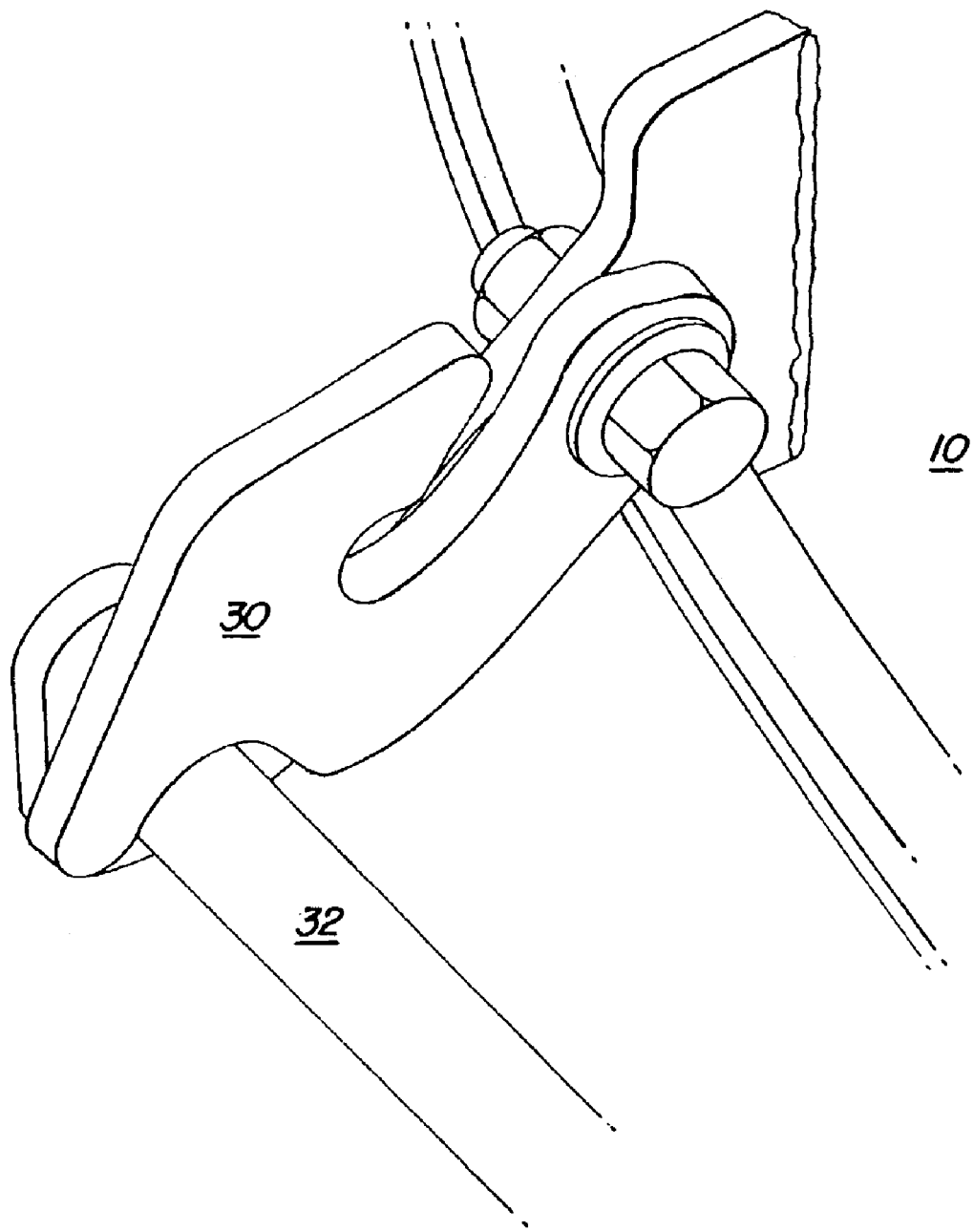
FIG. 3 is an enlarged front elevational perspective view illustrating one pivoting hook and the laterally extending stop bar carried at the front of the deck.
Figure 4:
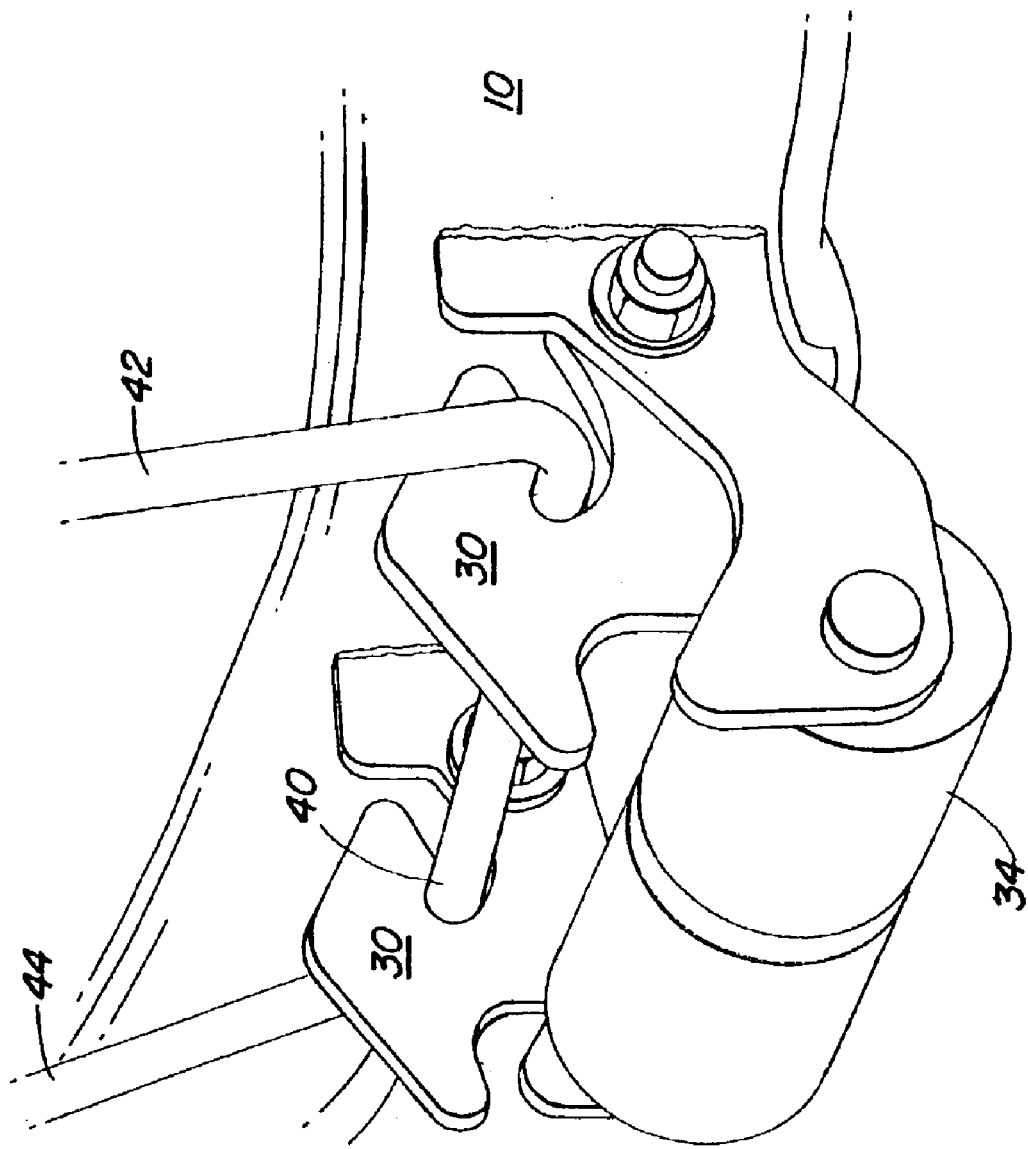
FIG. 4 is an enlarged front elevational perspective view illustrating the rear cross bar of the front hanger seated in the throats of the pivoting hooks.

At the front end of the mower 10 is provided the pivoting hooks 30 subject of the present invention. As is illustrated in FIGS. 3 and 4, a pair of laterally spaced apart hooks 30 are pivotally secured to the front of the deck 10. The hooks 30 are attached to allow them to freely swing in an arc. A laterally extending stop bar 32 prevents movement of the hooks 30 downwardly. As is best seen in FIG. 4, a pair of anti-scalp rollers 34 are also provided to lift the front of the deck 10 when stones or similar obstacles are encountered.

For supporting the front of the deck 10, a rectangularly shaped hanger 36 is provided. The hanger 36, which is illustrated in FIGS. 1 and 4, includes front and rear laterally extending crossbars 38 and 40 as well as laterally spaced apart fore and aft extending side draft links 42 and 44. Coupled with the front crossbar 38 is a bell crank arrangement 46 that can tension the draft links 42 and 44. For a detailed description of this type of hanger structure and bell crank, reference is made to the '617 patent.

As is illustrated in FIGS. 1 and 2, the suspension mechanism provides a four bar parallelogram lift arrangement to adjust the deck 10 evenly throughout its 1–3½ inch cut height range. The parallelogram geometry is established with the pivots A and C defined by the vehicle and B and D located on the deck 10. With the opposite first and rear sides of the parallelogram AB, CD being equal and the top and lower sides AC, BD being equal, the deck 10 rises or drops evenly as the lift links 18 are raised and/or lowered by the bell crank arrangement carried at the rear of the deck 10.

To mount the deck 10 to the tractor frame 12, it would be inserted between the front and rear wheels beneath the vehicle. The rear lift links 18 would be positioned within the brackets 36 and the spring loaded pins 28 used to couple the lower end of the lift links 18 to the rear of the deck 10. Then the rear crossbar 40 of the rectangularly shaped hanger 36 would be inserted into the pivoting hooks 30 on the deck 10. Because the hooks 30 can pivot to the stop bar 32 as shown in FIG. 3, the crossbar 40 can easily be inserted into the hooks 30. Then the front crossbar 38 would be positioned in the front hooks 16 carried on the tractor.

Next, the handle 48 coupled to the bell crank offset on the front crossbar 38 would be swung to tension the draft links 42 and 44. As tension is applied to the draft links 42 and 44, the rear crossbar 40 slides into and within the throats of the hooks 30 to the position illustrated in FIG. 1. As the draft links 42 and 44 are tensioned, the pivoting hooks 30 are free to swing upwardly. It will be noted that the rear crossbar 40 of the hanger 36 moves to occupy a position in line between the axes A and B. Accordingly, the proper parallelogram lift geometry is achieved to shift the deck 10 vertically throughout its cut height range.

Since the hooks 30 on the front of the deck 10 can pivot, it is easy to load the rear crossbar 40 into them. When tension is applied to the draft links 18, the hooks 30 swing into alignment with the parallelogram corners A and B. In this way, larger decks 10 with extended fore and aft dimensions can be accommodated by vehicles equipped with existing parallelogram lift geometry.

Figure 5:
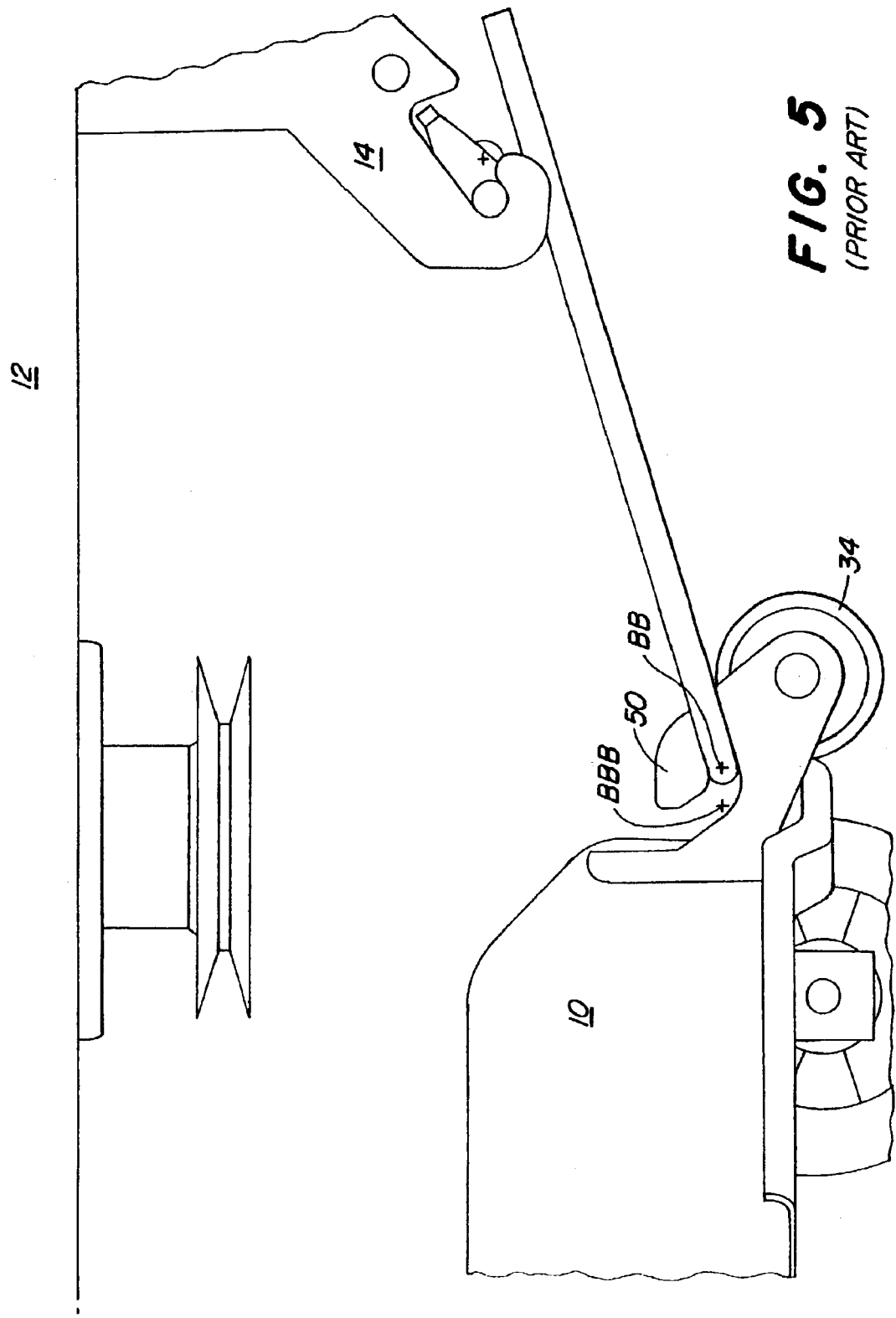
FIG. 5 is an enlarged schematic view illustrating the distortion in the parallelogram lift geometry that occurs when the prior art rigid hook is utilized on the larger deck. This view illustrates the deck in its lowered position.
Figure 6:
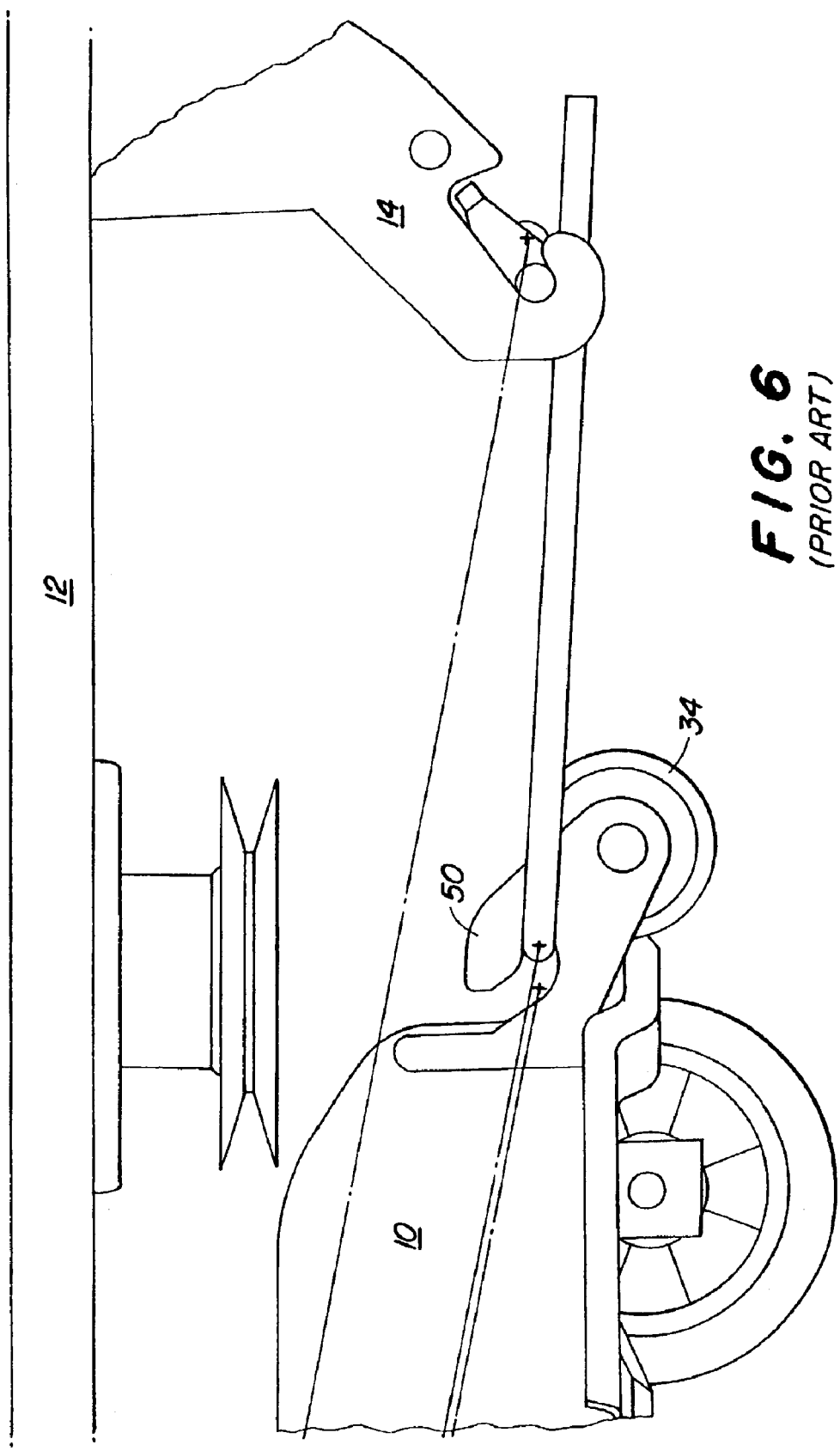
FIG. 6 is an enlarged schematic view similar to FIG. 5 but illustrating the deck in its raised position.

As is evident from FIGS. 5 and 6, providing the prior art rigid hook 50 on a larger stretched out deck does not retain the desired parallelogram lift geometry. As is seen in FIG. 5, the lower forward corner of the parallelogram at BB is forwardly offset from the desired location BBB. As is illustrated in FIG. 6, the rear crossbar 52 continues to be located forwardly of the desired parallelogram corner or pivot point when the deck 10 is raised. Further, the rear top edge of the prior art hook that inhibits movement of the crossbar up and out of the throat during operation also makes it difficult to load the crossbar into the hook when the deck has been extended forwardly.

With the present invention, there is provided a pivoting hook for a mower deck that serves to maintain the parallelogram lift geometry to enable the use of the decks with extended fore and aft dimensions.

Having described the preferred embodiment, it will become apparent that various modifications can be made without departing from the scope of the invention as defined in the accompanying claims.

What is claimed is:

1. A hook secured to a front end of a mowing deck and pivotable forwardly and downwardly about a laterally extending axis, the axis comprising one pivot corner of a four bar parallelogram lift linkage to connect the mowing deck to a vehicle.

2. A mowing implement, the mowing implement having a front end and a hook with a rear-facing throat to slidably receive a crossbar, the hook being pivotable forwardly and downwardly about a laterally extending axis to connect the front end of the mowing implement to a corner of a four bar parallelogram lift linkage.

3. The mowing implement of claim 2 further comprising a laterally extending bar stopping movement of the hook downwardly.

4. An implement adapted for connection with a vehicle, the implement comprising a hook with a rear-facing throat to slidably receive a crossbar, the hook secured to a front end of the implement and being pivotable forwardly and downwardly about a laterally extending axis, the axis comprising one pivot corner of a four bar parallelogram lift linkage.

5. The implement of claim 4 further comprising a laterally extending bar, the hook swinging in an arc forwardly and downwardly until blocked by the laterally extending bar.

6. An implement supported by a vehicle, the implement comprising a pair of laterally spaced apart hooks, a four bar parallelogram lift linkage, the pair of laterally spaced apart hooks pivoting forwardly and downwardly about a laterally extending axis in front of the mower deck to connect with the linkage.

7. The implement of claim 6 further comprising a laterally extending stop bar, the laterally extending stop bar limiting downward movement of the pair of laterally spaced apart hooks.

\* \* \* \* \*